United States Patent
Ernst et al.

(10) Patent No.: US 7,261,505 B2
(45) Date of Patent: Aug. 28, 2007

(54) SELF-DRILLING ANCHOR

(75) Inventors: Richard J. Ernst, San Diego, CA (US); George B. Dowse, Glen Carbon, IL (US)

(73) Assignee: Illinois Tool Works Inc., Glenview, IL (US)

( * ) Notice: Subject to any disclaimer, the term of this patent is extended or adjusted under 35 U.S.C. 154(b) by 49 days.

(21) Appl. No.: 10/938,425

(22) Filed: Sep. 10, 2004

(65) Prior Publication Data
US 2006/0245841 A1    Nov. 2, 2006

(51) Int. Cl.
*F16B 13/06* (2006.01)
(52) U.S. Cl. .............................. 411/35; 411/29; 411/30
(58) Field of Classification Search .................. 411/29, 411/30, 39, 40, 42, 80.1, 80.6, 35
See application file for complete search history.

(56) References Cited

U.S. PATENT DOCUMENTS

| | | | | |
|---|---|---|---|---|
| 1,120,412 | A | * 12/1914 | Rohmer | 411/35 |
| 1,808,318 | A | * 6/1931 | Pleister | 411/41 |
| 3,518,915 | A | * 7/1970 | Gutshall | 411/39 |
| 3,847,279 | A | 11/1974 | Montgomery | |
| 3,974,735 | A | * 8/1976 | Berner | 411/41 |
| 4,026,186 | A | * 5/1977 | Williams et al. | 411/29 |
| 4,182,217 | A | * 1/1980 | Runge | 411/35 |
| 4,601,625 | A | 7/1986 | Ernst et al. | |
| 4,666,354 | A | * 5/1987 | Hepworth | 411/40 |
| 4,878,790 | A | 11/1989 | McSherry et al. | |
| 5,147,166 | A | 9/1992 | Harker | |

(Continued)

FOREIGN PATENT DOCUMENTS

DE    17 50 492 A1    1/1971

(Continued)

OTHER PUBLICATIONS

Wallgripper Anchor by Cobra Anchors—Advertisement.

*Primary Examiner*—Flemming Saether
(74) *Attorney, Agent, or Firm*—Lisa M. Soltis; Mark W. Croll; Beem Patent Law Firm

(57) ABSTRACT

In one aspect, an anchor may include a threaded body, and a coaxial nut, wherein the anchor has a driving mode and an anchoring mode with the nut drawn rearwardly into the body by a threaded fastener to open the body radially outwardly. In another aspect, a one-piece self-drilling anchor includes a generally cylindrical threaded body with a pair of diametrically opposed inverted Y-shaped slits each having a generally axial slit and an inverted V-shaped pair of slits, a nut having splines for engage a threaded fastener, a pair of diametrically opposed inverted V-shaped wedges that are demarcated from the body by the V-shaped slits so that the body is relasably connected to the body, and a generally flat V-shaped drill tip. In still another aspect, a self-drilling anchor includes a threaded body that forks into a pair of diametrically opposed legs, a coaxially nut having splines for engaging a threaded fastener and a pair of diametrically opposed wedges, wherein when in the driving mode the wedges are connected between the legs to form a generally cylindrical portion, and wherein when in the anchoring mode the nut is drawn rearwardly into the body by the threaded fastener to pivot the legs radially outwardly.

16 Claims, 5 Drawing Sheets

U.S. PATENT DOCUMENTS

| | | | |
|---|---|---|---|
| 5,190,425 A * | 3/1993 | Wieder et al. | 411/29 |
| 5,308,204 A | 5/1994 | Moen | |
| 5,690,454 A | 11/1997 | Smith | |
| 6,186,716 B1 | 2/2001 | West et al. | |
| 6,291,555 B1 | 9/2001 | Surjan et al. | |
| 6,354,779 B1 | 3/2002 | West et al. | |

FOREIGN PATENT DOCUMENTS

| | | |
|---|---|---|
| DE | 3411253 A1 | 10/1984 |
| EP | 0 791 756 A | 8/1997 |
| FR | 2792292 | 10/2000 |
| FR | 2 868 818 A | 10/2005 |
| GB | 137 806 A | 9/1920 |
| GB | 2080906 A | 2/1982 |
| WO | 2004/053341 A | 6/2004 |

* cited by examiner

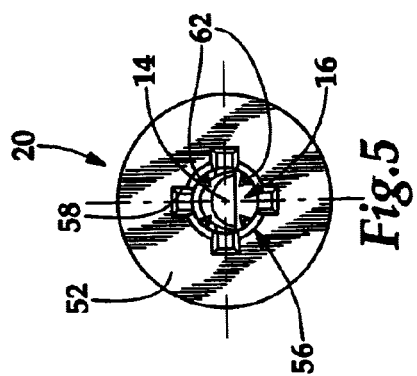
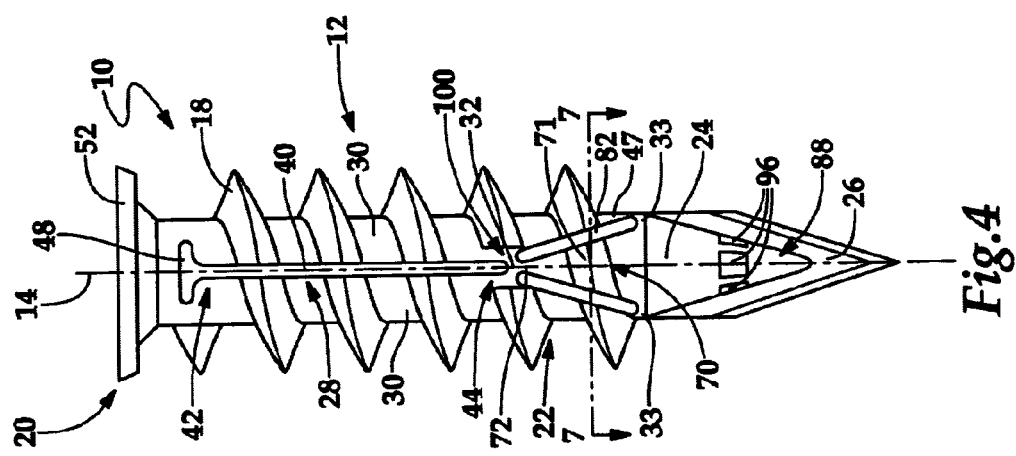
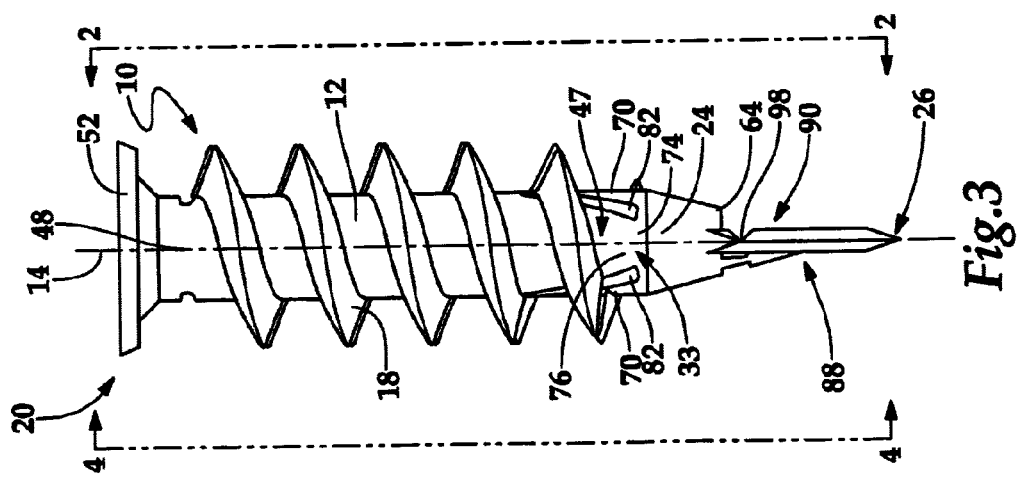

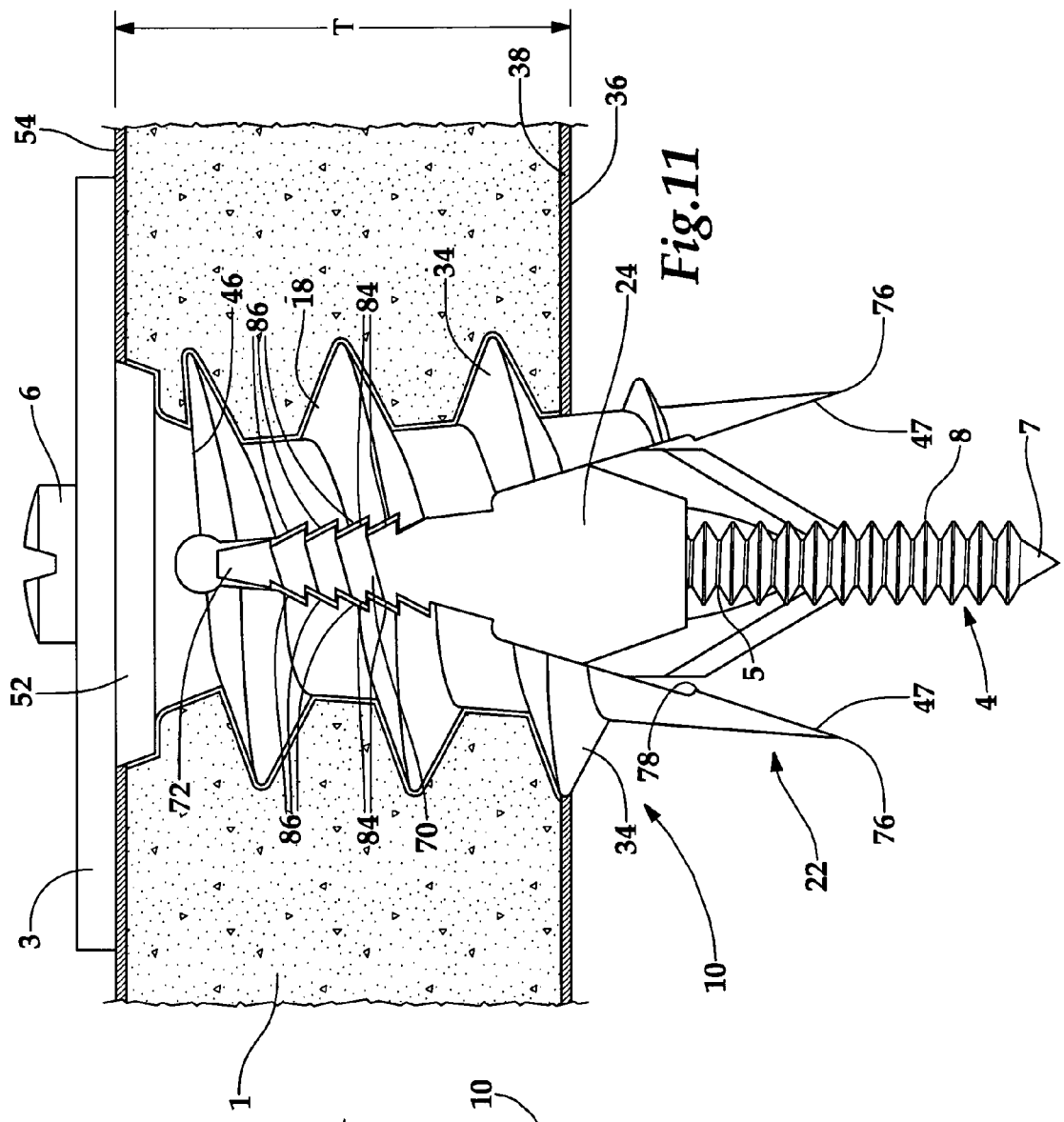
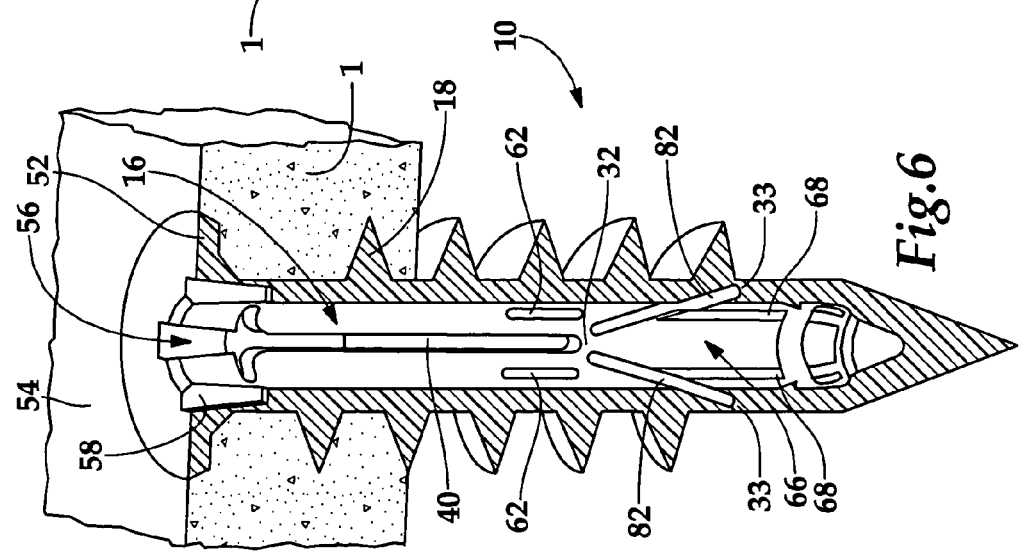

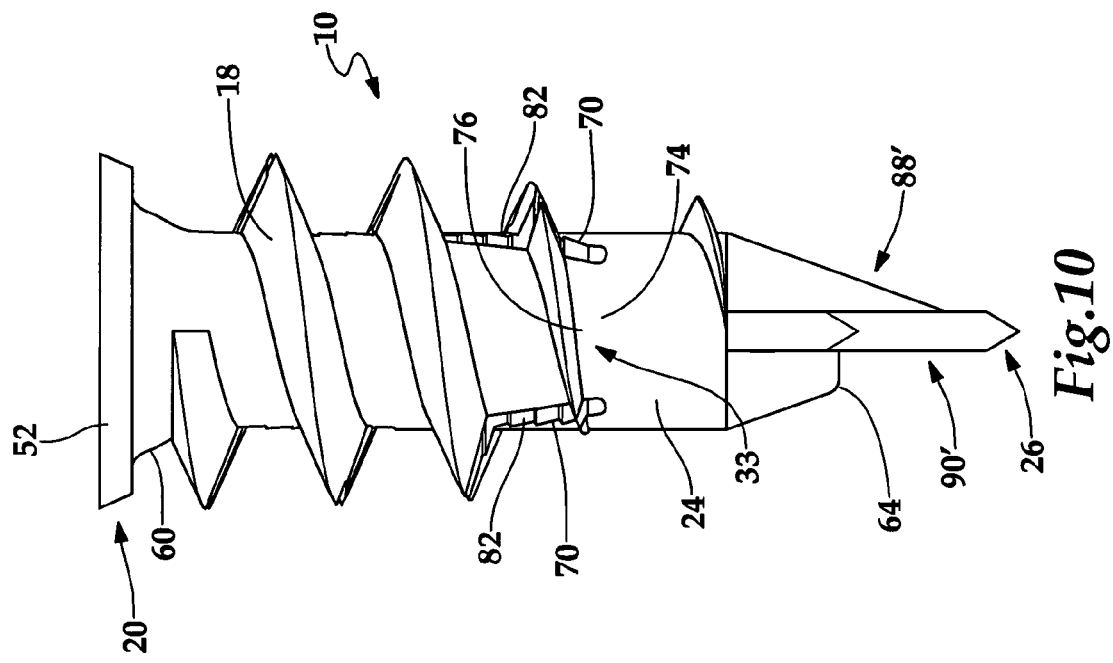
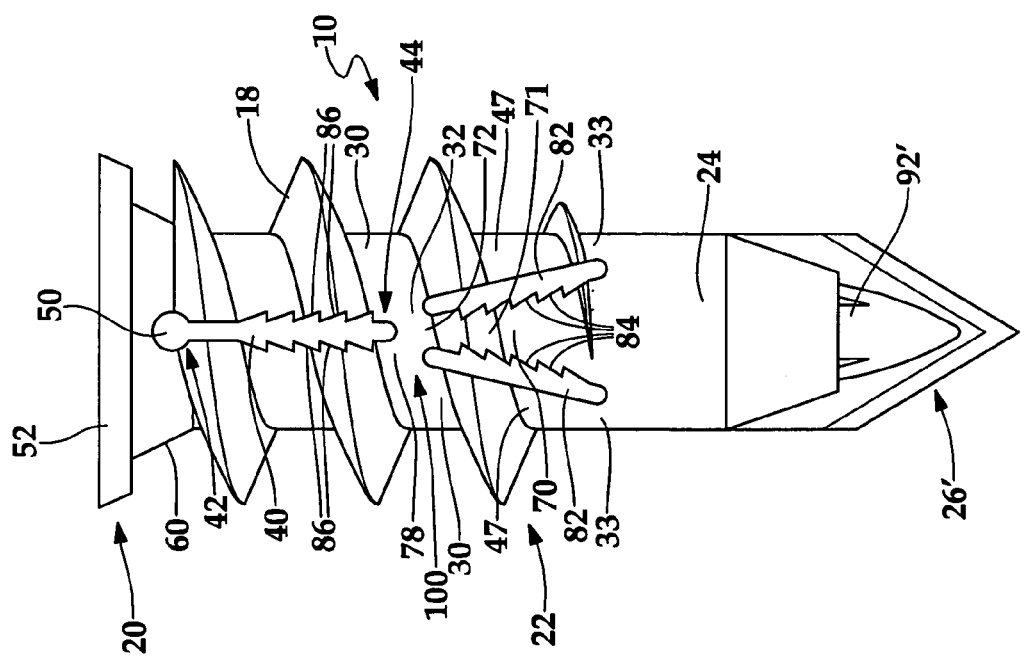

SELF-DRILLING ANCHOR

BACKGROUND OF THE INVENTION

1. Field of the Invention

The present invention is directed to an anchor for use in a friable substrate, particularly to a self-drilling anchor for use in drywall.

2. Description of the Related Art

Because drywall is a friable substrate, mounting articles thereto can be difficult. In the past, high-threaded self-drilling anchors have been used, such as those sold under the trademark E-Z ANCOR by ITW Buildex and disclosed in the commonly assigned U.S. Pat. No. 4,601,625. However, typical self-drilling anchors usually can hold only objects of light to moderate weight. In order to increase the load capacity of a self-drilling anchor, it was typically necessary to increase the diameter of the anchor, which increased the possibility of damage to drywall and left a large, unsightly hole in the drywall.

For heavier loads, toggle bolts and nylon toggles have been used. However, toggle bolts typically require a separate pre-drilling step and are usually expensive, complicated to install, and unreliable because a user typically has to undergo a difficult sequence of assembly to put together and install the toggle bolt. Nylon toggles are also unreliable and typically are only designed for predetermined drywall thicknesses.

Attempts have been made to improve pullout resistance without the increased expense and unreliability of toggle bolts. The anchor disclosed in U.S. Pat. No. 6,676,348 to Hoppe includes expandable tongues which help fasten the anchor in a substrate. However, the anchor of this patent requires a user to pre-drill a hole in the substrate. Moreover, the anchor does not include threading for engaging the substrate.

The self-drilling anchors disclosed in U.S. Pat. Nos. 6,186,716 and 6,354,779 to West et al. have a part that is pivoted into the drywall by a mounting fastener. While these anchors typically provide increased pullout resistance over typical self-drilling anchors, they usually do not provide enough anchor expansion to hold heavy objects.

Some self-drilling drywall anchors include portions that expand behind the drywall in an attempt to increase pullout resistance, such as the anchor sold under the trademark WALLGRIPPER by Cobra Anchors. However, anchors such as these are difficult for a user to get to function properly and may provide different results for different drywall thicknesses.

What is needed is an anchor for a friable substrate that may be easily installed and provides high pullout resistance and load capacity for heavy loads.

BRIEF SUMMARY OF THE INVENTION

In one aspect of the invention, an anchor includes a threaded body, and a coaxial nut, wherein the anchor moves between a contracted, driving mode for driving into the friable substrate, and an expanded anchoring mode wherein the nut is drawn rearwardly into the body by threaded engagement with a threaded fastener to open the body radially outwardly. The retractable nut expands the body into the friable substrate which may provide increased pullout resistance and load capacity. The nut may include a rear wedge to open the body radially outwardly, and in one embodiment the body splits into two or more legs which are pivoted outwardly by the nut to move the anchor into the anchoring mode. Preferably, the anchor includes a drill tip that extends forwardly of the front end of the body when the anchor is in the driving mode.

In another aspect of the invention, a one-piece self-drilling anchor comprises a generally cylindrical threaded body with a generally diametrically opposed pair of inverted Y-shaped slits each including a generally axial slit and an inverted V-shaped pair of slits, a nut having splines for engaging the threaded fastener and a generally diametrically opposed pair of inverted V-shaped wedges and a generally flat V-shaped drill tip, wherein the V-shaped wedges are demarcated from the body by the V-shaped slits and the nut is releasably connected to the body by lands spanning the V-shaped slits. The body may expand along the linear slit into a pair of legs which pivot outwardly as the legs are wedged apart by the inverted V-shaped wedges of the nut, which may be retracted by a threaded engagement between the threaded fastener and the splines.

In still another aspect, a self-drilling anchor includes a threaded body that forks into a generally diametrically opposed pair of legs, a coaxial nut with splines for engaging a threaded fastener and a generally diametrically opposed pair of wedges, wherein when in an driving mode the wedges are connected between distal ends of the legs to form a generally cylindrical portion, and wherein when in an expanded anchoring mode, the nut is drawn rearwardly into the body to pivot the legs radially outwardly.

These and other features and advantages are evident from the following description of the present invention, with reference to the accompanying drawings.

BRIEF DESCRIPTION OF THE SEVERAL VIEWS OF THE DRAWINGS

FIG. 3 is a plan view of the anchor.

FIG. 4 is a side view of the anchor taken along line 4-4 in FIG. 3.

FIG. 5 is an end view of the anchor.

FIG. 6 is a cross-sectional perspective view of the anchor installed in drywall in a driving mode.

FIG. 9 is a side view of an alternative embodiment of the anchor.

FIG. 10 is a plan view of the alternative embodiment of anchor.

FIG. 11 is a side-view of the alternative embodiment of the anchor installed in drywall in the anchoring mode.

DETAILED DESCRIPTION OF THE INVENTION

Figure 2:
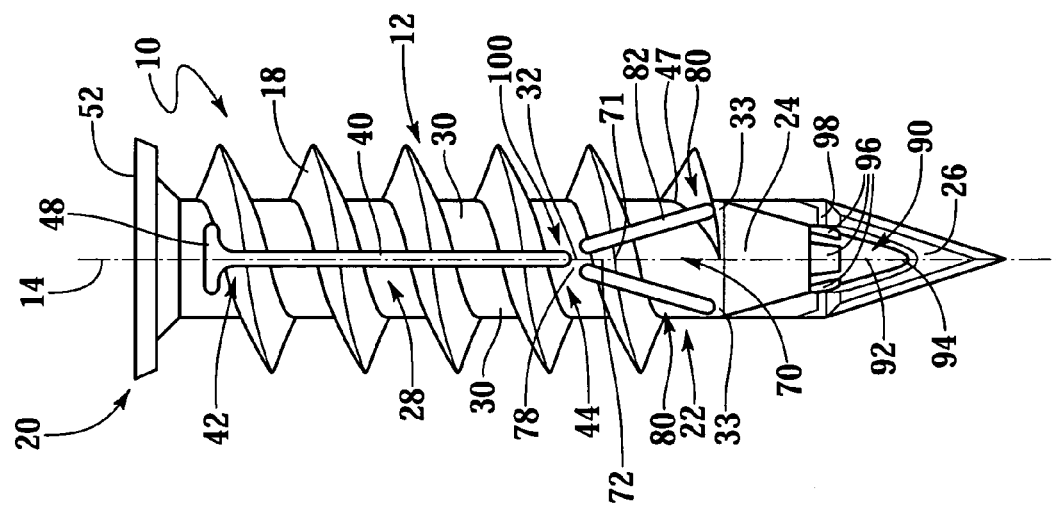
FIG. 2 is a side view of the anchor taken along line 2-2 in FIG. 3.
Figure 1:
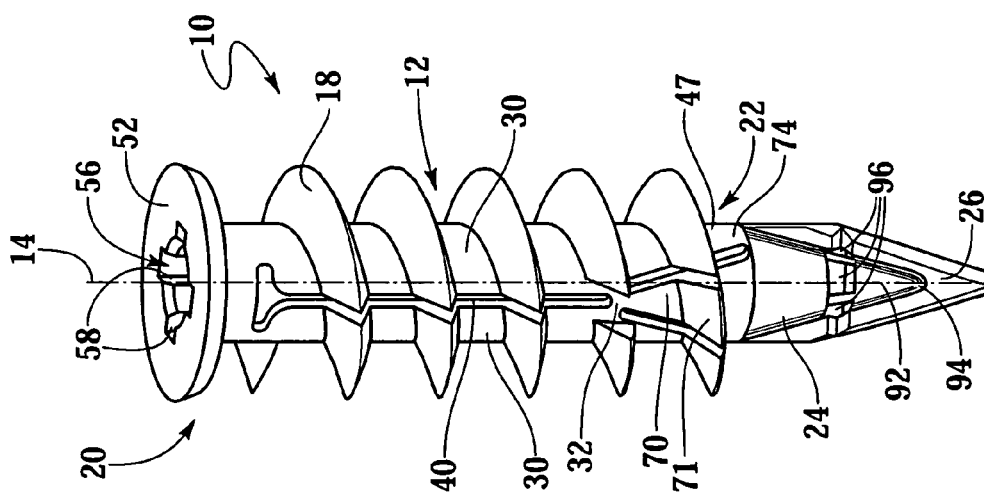
FIG. 1 is a perspective view of an anchor according to the present invention.
Figure 7:
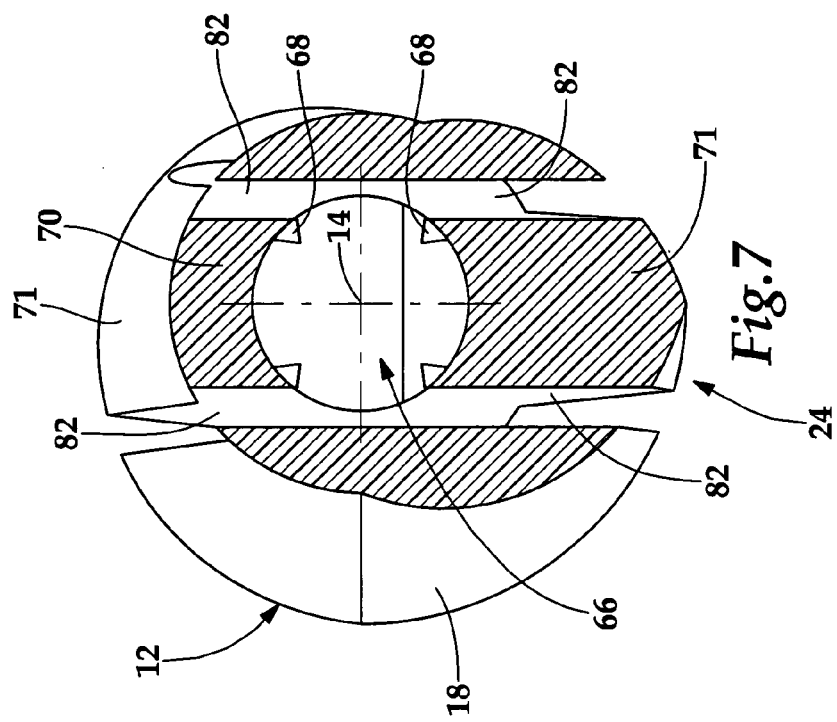
FIG. 7 is a cross-sectional view of a nut of the anchor taken along line 7-7 in FIG. 4.

Referring to FIGS. 1, 6, 8, and 11, an anchor 10 is shown for use with a threaded fastener 4 in a friable substrate 1, wherein anchor 10 includes a body 12 having an axis 14, an axial bore 16 for receiving fastener 4, external threading 18, a flanged rear end 20, a front end 22, and at least one area of weakness, such as a pair of slits 40, proximate front end 22, a coaxial nut 24, wherein anchor 10 has a driving mode (FIGS. 1 and 6) and an anchoring mode (FIGS. 8 and 11); when anchor 10 is in the driving mode, body 12 is generally cylindrical, external threading 18 is generally helical, and nut 24 is held proximate front end 22, and when anchor 10 is in the anchoring mode, nut 24 is drawn rearwardly into body 12 by fastener 4 and body 12 is opened radially outwardly along the at least one area of weakness. Preferably, anchor 10 includes a drill tip 26 so that anchor 10 is a self-drilling anchor for drilling into the friable substrate 1.

Anchor 10 provides increased pullout resistance and load capacity in friable substrate 1 for mounting an article 3 to friable substrate 1. Anchor 10 provides stronger engagement and higher pullout resistance in friable substrate 1 than a conventional threaded drywall anchor without having to increase the diameter of anchor 10 over that of a conventional anchor. Anchor 10 includes features that allow anchor 10 to achieve higher pullout resistance and load capacity, thereby increasing performance without increased installation difficulties for the user. Surprisingly, anchor 10 with retractable nut 24 for expanding body 12 radially outwardly may be able to achieve pullout strengths in ½ inch drywall 1 of as much as about 100 pounds or more in ideal conditions.

Friable substrate 1 may be one of several materials used in construction, such as stucco, plaster, or gypsum based drywall 1 sold under the trademark SHEETROCK by United States Gypsum. Drywall 1 may have a range of thicknesses T, typically between about ½ inch and about ⅝ inch, but it may be obtained in other thicknesses, such as about ⅜ inch. Preferably, anchor 10 provides increased pullout resistance over a range of drywall thicknesses T.

Figure 8:
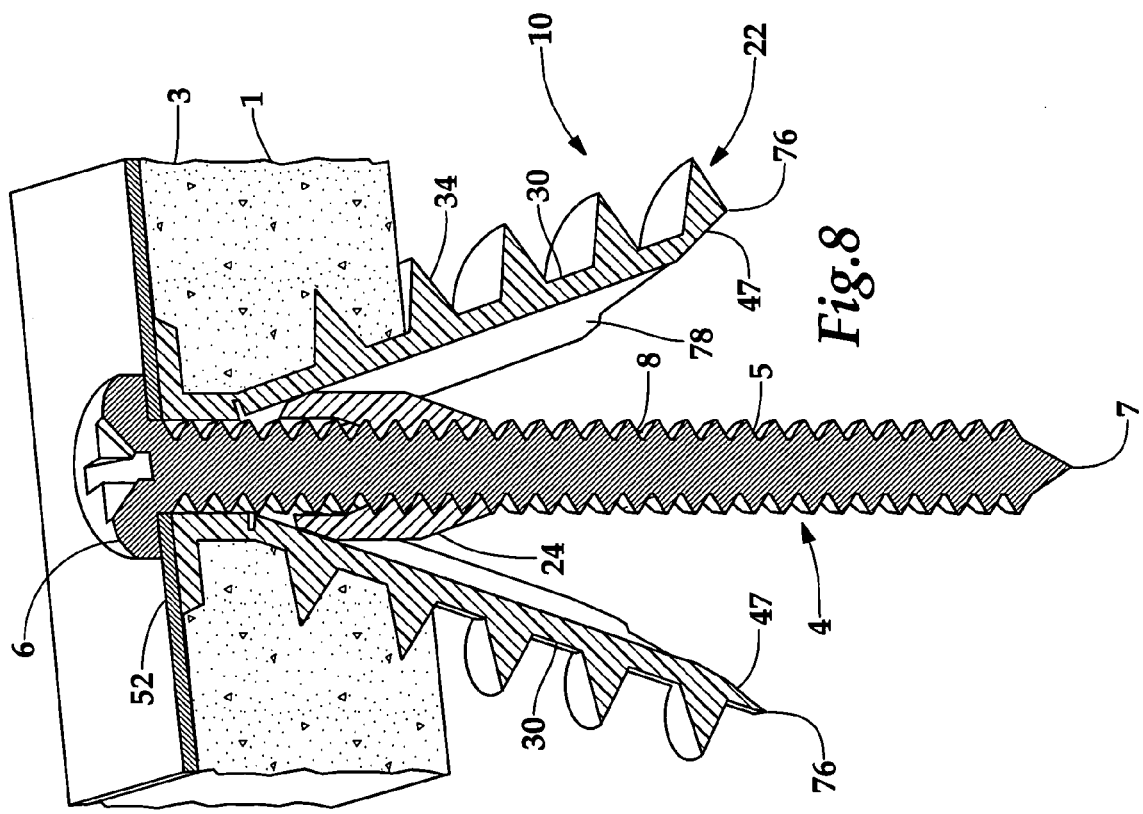
FIG. 8 is a cross-sectional view of the anchor installed in drywall in an anchoring mode.

Continuing with FIGS. 8 and 11, fastener 4 is a threaded fastener, such as a mounting screw, having an elongate shank 5 with a head 6 at one end and a tip 7 at the other. Shank 5 of fastener 4 includes threads 8 which engage nut 24 of anchor 10. Preferably, fastener 4 is at least as long as body 12 so that fastener 4 will extend through article 3 and body 12 so that fastener threads 8 engage nut 24.

External threading 18 is disposed on the outer surface of body 12 and has a high thread to maximize the surface area of threading 18 encountered by drywall 1, increasing the pullout resistance and load capacity. The crest diameter of threading 18 may be between about 0.4 inch and about ¾ inch, preferably about ½ inch, and the root diameter of threading 18 may be between about 0.2 inch and about ⅜ inch, preferably about ¼ inch. In one embodiment, the crest diameter of threading 18 is about twice its root diameter.

Turning to FIGS. 1-4, in one embodiment, the area of weakness includes at least two generally axial fault lines 28, wherein when anchor 10 is in the anchoring mode body 12 splits into at least two axial legs 30 along axial fault lines 28 and legs 30 are pivoted outwardly by nut 24, see FIG. 8. Preferably, when anchor 10 is in the driving mode, legs 30 are joined by lands 32 spanning axial fault lines 28. Preferably, fault lines 28 are a set of linear slits 40 axially extending along body 12. In one embodiment, fault lines 28 split body 12 including external threading 18 so that a portion 34 of threading 18 is on each leg 30 (FIG. 8) are wedged into drywall 1 when anchor 10 is in the anchoring mode. Preferably, portion 34 of threading 18 on each leg 30 is wedged into paper 38 on inner drywall surface 36, as shown in FIG. 11, so that the thread portions 34 act as barbs to engage paper 38 to provide even higher pullout resistance.

In one embodiment, body 12 includes a pair of generally diametrically opposed axial fault lines or slits 40 that each extend from a rear end 42 proximate flanged rear end 20 of body 12, i.e., between about 0.01 inch and about ⅛ inch, preferably about 0.075 inch, to a front end 44 proximate front end 22 of body 12. Body 12 forks along slits 40 into a pair of diametrically opposed legs 30, wherein each leg 30 has a pivot point 46 proximate flanged rear end 20 and a distal end 47 and each leg 30 is a generally semi-cylindrical portion that is generally symmetrical with the other leg 30. Rear ends 42 of slits 40 that are closely spaced from flanged rear end 20 allow legs 30 to pivot farther outwardly with less likelihood of breaking at their pivot points 46 of legs 30. Preferably, each slit 40 includes an eyelet 48, 50 at rear slit end 42 between legs 30 at pivot point 46, wherein eyelet 48, 50 is wider than slit 40, such as the T-shaped eyelet 48 shown in FIG. 4 or the generally round eyelet 50 shown in FIG. 9. Eyelet 48, 50 reduces the potential stress at rear slit end 42, allowing legs 30 to pivot outwardly easier and reduces the potential of break-off of legs 30 as they are pivoted outwardly.

It has been found that engagement between threading 18 and paper 38 on inner drywall surface 36 provides a substantial portion of the grip between anchor 10 and drywall 1. Therefore, it is preferable that legs 30 have a length that is long enough so that legs 30 will extend through the thickest expected drywall l so that legs 30 are wedged into inner drywall surface 36 to engage paper 38 to allow anchor 10 to be used in drywall 1 having a range of thicknesses T while still providing engagement with paper 38 on inner drywall surface 36. In one embodiment, shown in FIGS. 6 and 8, legs 30 are substantially longer than the drywall thickness T, i.e. between about 0.95 inch and about 1½ inch, preferably about 1 inch, to assure that threading portions 34 will engage paper 38, even in relatively thick drywall. In an alternative embodiment, shown in FIG. 1, legs 30 have a shorter length of between about ¾ inch and about 0.95 inch, preferably about 0.9 inch to accommodate relatively thin articles 3 and drywall 1 having a thickness of about ½ inch or about ⅝ inch so that legs 30 have just enough length for threading portions 34 to engage paper.

Turning to FIGS. 5 and 6, flanged rear end 20 includes a flange 52 for engaging outer surface 54 of drywall 1 when anchor 10 is installed. Flange 52 includes a recess 56 having torque transmitting surfaces 58 therein for receiving a rotary driver (not shown) such as a screwdriver. Preferably recess 56 is a Phillips-type recess for receiving a tip of a Phillips-type driver. Because the rotary driver may have an effective diameter that is larger than the diameter of bore 16, the wall thickness of body 12 at recess 56 may be thin. In one embodiment, best seen in FIG. 9, anchor 10 includes a thickened wall at recess 56 which forms a hump 60 for reinforcing recess 56. Preferably, the thickened wall and hump 60 axially extend along the entire length of recess 56 to fully support recess 56 during driving of anchor 10.

In one embodiment, body 12 includes small braking splines 62 within bore 16 of body 12, see FIGS. 5 and 6, that prevent a user from inserting fastener 4 through body 12 too quickly or with too much force, so that nut 24 is not broken off body 12 before fastener threads 8 have engaged nut 24. The small braking splines 62 radially protrude into bore 16, wherein splines 62 have a radial extent that define an inner diameter that is slightly smaller than the outer diameter of fastener threads 8. This slightly smaller inner diameter prevents a user from jamming fastener 4 through body 12 by requiring rotation of fastener 4 to engage threads 8 with splines 62 to drive fastener 4 past splines 62. Preferably, the radial extent of splines 62 is small enough so that they do not overly engage fastener threads 8 or make it difficult for a user to insert fastener 4 through body 12. Preferably, the engagement between braking splines 62 and fastener 4 is light enough that fastener threads 8 will strip out splines 62 when fastener threads 8 begin to engage nut 24, described below. The engagement between fastener 4 and body 12 may also be accomplished with a slightly undersized portion of body bore 16 which lightly engages fastener threads 8.

Nut 24 is held proximate front end 22 when anchor 10 is in the driving mode so that when nut 24 is drawn rearwardly into body 12, body 12 is expanded outwardly far enough to sufficiently grip drywall 1. Preferably, when anchor 10 is in the driving mode, nut 24 is connected to front end 22 of body 12, and drill tip 26 is connected to front end 64 of nut 24 so that nut 24 is positioned so that drill tip 26 is presented forwardly to drill through drywall 1 when anchor 10 is in the driving mode and so that nut 24 is retracted rearwardly into body 12 when anchor 10 is moved to the anchoring mode.

In one embodiment, shown in FIG. 6, nut 24 includes a bore 66 that is generally coaxial and aligned with body bore 16. Bore 66 of nut 24 is configured so that when fastener 4 is inserted through bore 16 of body 12 and fastener head 6 is seated against article 3, fastener threads 8 threadingly engage nut 24 to draw nut 24 rearwardly toward flanged rear end 20 to move body 12 into the anchoring mode. The threaded engagement between fastener threads 8 and nut 24 may be accomplished by sizing nut bore 66 slightly smaller than the outer diameter of fastener 4, providing threading (not shown) within nut bore 66 that mates with fastener threads 8, or providing splines 68. In one embodiment, nut 24 includes a set of at least two splines 68 that protrude into nut bore 66 to engage fastener threads 8. Preferably, splines 68 have a radial extent defining an inner diameter of nut bore 66 that is less than an outer diameter of fastener 4.

Nut 24 may include at least one rear wedge 70, wherein when anchor 10 is in the anchoring mode, rear wedge 70 opens body 12 radially outwardly. Preferably, body forks into at least two axial legs 30, wherein when anchor 10 is in the driving mode, rear wedge 70 is positioned between legs 30 so that legs 30 and rear wedge 70 form a generally cylindrical portion, and when in the anchoring mode rear wedge 70 opens body 12 radially outwardly by wedging between legs 30. Preferably, rear wedge 70 includes a thread portion 71, wherein when anchor 10 is in the driving mode, thread portion 71 is substantially aligned with threading 18.

In one embodiment, shown in FIGS. 2-4, nut 24 includes a pair of generally diametrically opposed rear wedges 70 that are oriented so that they interfit with legs 30 at front end 22 of body 12. In one embodiment, at least one and preferably both rear wedges 70 include a thread portion 71. Preferably, each rear wedge 70 has an inverted V-shape with a tip 72 and a pair of troughs 74 between rear wedges 70. Similarly, distal ends 47 of legs 30 correspond to rear wedges 70, wherein each distal end 47 has a tip 76 with a pair of troughs 78 between distal ends 47. When anchor 10 is in the driving mode, rear wedges 70 interfit with distal ends 47 of legs 30 to form a generally cylindrical portion that corresponds with the generally cylindrical shape of body 12. When rear wedges 70 and distal ends 47 are interlocked in the driving mode, as shown in FIGS. 1-4, tips 72 of rear wedges 70 are joined with troughs 78 between distal ends 47 by first lands 32 and tips 76 of distal ends 47 are joined with troughs 74 between rear wedges 70 by second lands 33. Preferably, lands are sized a positioned to maintain structural integrity of anchor 10 while being driven into drywall 1. This configuration provides four solid connection points between body 12 and nut 24 that are radially spaced around anchor 10, and axially spaced to provide adequate support between body 12 and nut 24 as anchor 10 drills through drywall 1. This configuration also allows rear wedges 70 to be nested between distal ends 47 of legs 30 so that rear wedge 70 of nut 24 forms part of a generally cylindrical root of exterior threading 18, wherein thread portions 71 are aligned with exterior threading 18 so that threading 18 and thread portions 71 act as a substantially continuous helical thread to pull anchor 10 through drywall 1 as anchor 10 is being installed.

When fastener head 6 is seated and fastener threads 8 substantially fully engage nut 24, nut 24 tends to grip fastener threads 8 and be rotated along with fastener 4, particularly after the point of fracture when lands 32, 33 have been broken and there is no engagement between nut 24 and body 12. Thread portions 71 on rear wedges 70 acts as stops to prevent nut 24 from rotating along with fastener 4 instead of being drawn up into body 12. If nut 24 begins to rotate with fastener 4, thread portion 71, which protrudes radially outwardly between legs 30, bumps into adjacent leg 30 and threading 18 so that legs have bearing on nut 24 to prevent further rotation of nut 24 with respect to body 12, allowing fastener threads 8 to threadingly engage splines 68 and draw nut 24 rearwardly until legs 30 are expanded outwardly.

Nut 24 should be long enough so that there is enough of a positive engagement between fastener threads 8 and nut 24, i.e. with splines 68, to retract nut 24 into body 12 to expand legs 30 radially outwardly. Preferably, nut 24 is long enough so that when nut 24 has expanded body 12 into the anchoring mode, the user feels a torque ramp-up so that the user knows anchor 10 is adequately anchored in drywall 1 and can stop driving fastener 4. In one embodiment, each rear wedge 70 has an axial length of between about ¼ inch and about ½ inch, preferably about ⅜ inch, and nut 24 (including rear wedges 70) has a total length of between about ⅝ inch and about 1 inch, preferably about ¾ inch.

Continuing with FIGS. Each rear wedge 70 forms an angle between slits 82 of between about 15° and about 45°, preferably between about 20° and about 35°, still more preferably about 24°. Preferably, distal ends 47 of legs 30 form an angle with respect to each other that substantially corresponds to the angle of rear wedge 70 to facilitate rear wedge 70 wedging between legs 30 to pivot them outwardly.

Anchor 10 may also include fault lines 80, such as the inverted V-shaped slits 82 shown in FIG. 2, between body 12 and nut 24, wherein nut 24 is preferably joined to front end 22 of body 12 by lands 32, 33 spanning fault lines 80 when anchor 10 is in the driving mode, and wherein nut 24 is broken away from body 12 along fault lines 80 when anchor 10 is in the anchoring mode because lands 32, 33 are broken.

Preferably, anchor 10 is configured so that fastener 4 may be retractable from body 12 while anchor 10 remains in the anchoring mode, so that fastener 4 can be reinserted at a later time. In one embodiment, shown in FIGS. 9 and 11, at least one of the rear wedges 70 includes one or more teeth 84, and preferably a set of teeth 84, on each side of rear wedge 70, wherein teeth 84 protrude from rear wedge 70 so that the width of rear wedge 70 at each tooth 84 is slightly larger than the width of rear wedge 70 immediately in front of tooth 84. Body 12 includes one or more corresponding notches 86 at slit 40 located at a predetermined axial position in leg 30, preferably a set of notches 86 in each leg 30 to correspond with set of teeth 84. Notches 86 and teeth 84 have a complementary geometry so that when nut 24 is drawn rearwardly to the position of notches 86, some of the teeth 84 of nut 24 engage notches 86 to create an interference fit, holding nut 24 in place and keeping body 12 expanded in the anchoring mode, even if fastener 10 is retracted from body 12 and engagement with nut 24. Teeth 84 and notches 86 allow a user to remove fastener 4 so as to remove article 3 from drywall 1 and then mount another article at the same position on drywall 1 or remount the original article 3, using the same anchor 10.

Drill tip 26 may have many configurations, such as a generally cylindrical drill tip having one or more helical flutes (not shown) for drilling out drywall 1, but preferably drill tip 26 includes a generally flat, V-shaped drill tip 26. In one embodiment, shown in FIG. 3, drill tip 26 includes a closed side 88 and an open side 90 so that a fastener 4 that is longer than body 12 can exit drill tip 26. Open side 88 allows drill tip 26 to be generally centered with respect to axis 14 while still allowing fastener tip 7 to bypass drill tip 26. Open side 88 includes a shallow, spoon-shaped recess 92 in drill tip 26 that opens outwardly, wherein recess 92 is aligned with bore 66 of nut 24. Preferably, recess 92 has a generally conical shape to correspond with fastener tip 7, wherein a pointed end 94 of recess 92 and drill tip 26 are aligned along axis 14 of anchor 10. As fastener 4 is inserted through body 12 and nut 24, fastener tip 7 encounters end 94 of recess 92 so that fastener 4 deflects drill tip 26 away from fastener 4 as fastener 4 is driven forwardly.

In one embodiment, shown in FIGS. 2-4, drill tip 26 has a relatively thin wall between recess 92 and closed side 88, windows 96 through drill tip 26 between recess 92 and open side 90, and a notch 98 at the juncture between drill tip 26 and nut 24, wherein the thin wall, windows 96 and notch 98 allow drill tip 26 to more easily pivot away from fastener 4 toward closed side 88. In an alternative embodiment, shown in FIGS. 9 and 10, drill tip 26' includes a thicker wall between recess 92' and closed side 88' and there is no opening or window between recess 92, and closed side 88, and there is no notch at the juncture between drill tip 26 and nut 24. Drill tip 26 of the alternative embodiment provides additional strength to drill tip 26 so that it more easily drills through drywall 1.

Continuing with FIG. 9, when in the driving mode, anchor 10 is a one-piece self-drilling drywall anchor that includes generally cylindrical body 12 having axis 14, axial bore 16 for receiving threaded fastener 4, high external threading 18, a flange 52 having a recess 56 for receiving a rotary driver (not shown), and a generally diametrically opposed pair of inverted Y-shaped slits 100 each comprising a generally axial slit 40, preferably running generally parallel to axis 14 from an eyelet 48, 50 proximate flange 52, and a V-shaped pair of slits 82, nut 24 having coaxial bore 66 for engaging threaded fastener 4, i.e. with splines 68, a generally diametrically opposed pair of rearward facing V-shaped wedges 70, and a generally flat V-shaped drill tip 26, wherein the pair of inverted V-shaped wedges 70 are demarcated from body 12 by inverted V-shaped pairs of slits 82. Preferably, V-shaped wedges 70 are releasably connected to body 12 by lands 32, 33 spanning V-shaped pairs of slits 82.

V-shaped slits 82 provide for an inverted V-shaped recess in front end of body 12 between legs 30 that corresponds to inverted V-shaped rear wedges 70 of nut 24. The corresponding wedges 70 and recess in body 12 allows wedges 70 to interfit with body 12 when anchor 10 is in the driving mode, and allows wedges 70 to most effectively wedge between legs 30 when anchor 10 is in the anchoring mode.

In the embodiment shown in FIG. 9, anchor 10 includes body 12 having axis 14, axial bore 16 for receiving fastener 4, external threading 18, flanged rear end 20, front end 22, and a pair of diametrically opposed legs 30 each axially extending from a pivot point 46 proximate flanged rear end 22 to distal end 47, there being a pair of diametrically opposed eyelets 48, 50 in body 12 between legs 30 at pivot point 46, a coaxial nut 24 having a bore 66 generally coaxial with body bore 16, a set of splines 68 protruding radially into nut bore 66 for engaging fastener 4, and a pair of diametrically opposed rear wedges 70 positioned between the pair of legs 30, at least one of the rear wedges 70, and preferably both rear wedges 70, having external thread portion 71 thereon, and a generally flat V-shaped drill tip 26, wherein anchor 10 has a driving mode and an anchoring mode; when anchor 10 is in the driving mode, the pair of legs 30 are joined by lands 32 proximate distal ends 47, a rear end, i.e. tip 72, of each rear wedge 70 is connected between distal ends 47 to form a generally cylindrical portion which includes legs 30 and rear wedges 70 so that thread portion 71 is generally aligned with external threading 18, and drill tip 26 is presented forwardly of distal ends 47; and when anchor 10 is in the anchoring mode, fastener 4 extends through body bore 16 and nut bore 66 and engages splines 68 of nut 24, lands 32 are broken and nut 24 is drawn into body 12 toward flanged rear end 20 by fastener 4 to pivot legs 30 radially outwardly.

Method of Use

Anchor 10 is used to mount article 3 to drywall 1 by a method having the steps of providing a user with anchor 10 which is formed in the driving mode, selecting a desired position on drywall 1 where article 3 is to be mounted, placing drill tip 26 of anchor 10 against outer drywall surface 54 at the selected position, rotating anchor 10, i.e. by inserting a rotary driver, such as a manual or powered screwdriver, into recess 56, rotating the rotary driver, and engaging torque transmitting surfaces 58, which in turn rotates anchor 10, engaging drywall 1 with threading 18 to pull anchor 10 through drywall 1 until flange 52 abuts outer drywall surface 54, positioning article 3 so that it is adjacent to drywall 1 at the position of installed anchor 10, inserting fastener 4 through article 3 and into body bore 16, engaging fastener threads 8 with nut 24, i.e. by engaging splines 68 within nut bore 66, drawing fastener through nut 24 until fastener head 6 abuts article 3, drawing nut 24 rearwardly with fastener 4, and expanding body 12 radially outwardly into drywall 1 by pivoting legs 30 outwardly with nut 24.

Method of Making

Anchor 10 is made by molding or casting material in a cavity or die. Anchor 10 may be made from a material capable of drilling through drywall 1 and able to be expanded radially outwardly to wedge into drywall 1. Anchor 10 may be made from metal, such as zinc, and preferably is made from plastic, still more preferably, nylon. The interior of the cavity or die may have generally the same geometry as anchor 10 when it is in the driving mode, providing, e.g. for formation of slits 40, 82 along body 12.

In a zinc-casting method, molten zinc may be poured into a die and allowed to set. The die is opened, and the resulting anchor 10 may be finished to form the desired self-drilling anchor 10. Preferably, however, anchor 10 is injection molded from plastic by injecting the plastic into a cavity.

The self-drilling anchor provides a nut which is drawn up into body of the anchor to expand the body into the drywall and increase pullout resistance and load capacity without making installation of the anchor more difficult for the user.

While the foregoing written description of the invention enables one of ordinary skill to make and use what is considered presently to be the best mode thereof, those of ordinary skill will understand and appreciate the existence of variations, combinations, and equivalents of the specific exemplary embodiment herein. The invention should therefore not be limited by the above described embodiment and method, but by all embodiments within the scope and spirit of the invention as claimed.

What is claimed is:

1. A self-drilling anchor for use in a friable substrate comprising:
   a body having an axis, an axial bore for receiving a threaded elongated fastener, external threading, a flanged rear end, a front end, and a pair of diametrically opposed legs each axially extending from a pivot point proximate said flanged rear end to a distal end, there being a pair of diametrically opposed eyelets in said body between said legs at said pivot points;
   a coaxial nut having a bore generally coaxial with said bore of said body, a set of splines protruding radially into said bore of said nut for engaging said threaded fastener, and a pair of diametrically opposed wedges, each with a tip, positioned between said pair of legs, at least one of said wedges having an external thread portion thereon; and
   a generally flat V-shaped drill tip;
   said self-drilling anchor having an initial, driving mode wherein said tips of said wedges are joined with troughs located between said distal ends of said legs by a first plurality of lands and tips of said legs are joined with troughs located between said wedges by a second plurality of lands to form a generally cylindrical portion and to provide adequate support between said body and said nut as said anchor drills through said friable substrate, said thread portion of said at least one wedge is generally aligned with said external threading, and said generally flat V-shaped drill tip is presented forwardly of said distal ends;
   wherein said nut is adapted to be drawn rearwardly through said anchor to break said first plurality of lands and said second plurality of lands and pivot said pair of legs radially outwardly.

2. An anchor according to claim 1, wherein when in said driving mode said generally flat V-shaped drill tip is connected to a front end of said nut.

3. An anchor according to claim 1, further comprising at least one area of weakness comprising at least two generally axial fault lines, wherein said body is capable of splitting into said pair of legs along said at least two axial fault lines.

4. An anchor according to claim 1, wherein when in said driving mode said nut is connected to said front end of said body.

5. An anchor according to claim 1, further comprising fault lines between said body and said nut, wherein when in said driving mode said nut is joined to said body by said first plurality of lands and said second plurality of lands spanning said fault lines, wherein said nut is adapted to break away from said body along said fault lines after said anchor is driven into said friable substrate.

6. An anchor according to claim 1, wherein said self-drilling anchor is molded from plastic.

7. An anchor according to claim 1, wherein said self-drilling anchor is formed from zinc.

8. An anchor according to claim 1, wherein said body includes at least two splines having a radial extent into said bore defining an inner diameter of said bore that is less than an outer diameter of said threaded fastener.

9. An anchor according to claim 1, wherein said threaded fastener is at least about as long as said body.

10. An anchor according to claim 1, wherein said threaded fastener is retractable from said body.

11. An anchor according to claim 1, wherein said body includes a notch, wherein said nut is capable of engaging said notch to hold said nut when said threaded fastener is retracted from said body.

12. An anchor according to claim 1, wherein said body includes a set of notches and said nut includes a set of teeth, wherein said teeth are capable of engaging said notches to hold said nut when said threaded fastener is retracted from said body.

13. An anchor according to claim 1, further comprising:
   a generally diametrically opposed pair of inverted Y-shaped slits each comprising a generally axial slit and a pair of V-shaped slits;
   wherein said wedges are demarcated from said body by said pair of V-shaped slits and said nut is removably connected to said body by said first plurality of lands and said second plurality of lands spanning said V-shaped slits.

14. An anchor according to claim 1, wherein each one of said legs has a length of between about 0.95 inch and about 1½ inch.

15. An anchor according to claim 1, wherein each one of said legs has a length of between about ¾ inch and about 0.95 inch.

16. An anchor according to claim 1, wherein said legs are long enough to engage a paper backing on an interior side of said friable substrate.

* * * * *